United States Patent [19]

Willard et al.

[11] Patent Number: 4,861,609

[45] Date of Patent: Aug. 29, 1989

[54] PREVENTION OF PUFFING DURING FRYING OF EXPANDED SNACK PRODUCTS

[76] Inventors: Miles J. Willard, P.O. Box 1747, Idaho Falls, Id. 83401; Kyle E. Dayley, Rte. 4, Box 361, Rigby, Id. 83442

[21] Appl. No.: 257,144

[22] Filed: Oct. 7, 1988

Related U.S. Application Data

[63] Continuation of Ser. No. 786,162, Oct. 9, 1985, abandoned, which is a continuation of Ser. No. 684,966, Dec. 20, 1984, abandoned, which is a continuation of Ser. No. 583,283, Feb. 27, 1984, abandoned.

[51] Int. Cl.$^4$ .................. A23L 1/217; A23L 1/10; A21D 2/36
[52] U.S. Cl. .................... 426/550; 426/560; 426/438; 426/439; 426/388; 426/808
[58] Field of Search .................. 426/438–440, 426/808, 550, 560, 388

[56] References Cited

U.S. PATENT DOCUMENTS

| | | | |
|---|---|---|---|
| 3,259,503 | 7/1966 | Tan et al. | 99/83 |
| 3,399,062 | 8/1968 | Willard et al. | 426/808 X |
| 3,539,356 | 11/1970 | Benson et al. | 426/560 |
| 3,656,966 | 4/1972 | Ball | 426/808 X |
| 3,719,501 | 3/1973 | Rispoli | 426/808 X |
| 3,800,050 | 3/1974 | Popel | 426/343 |
| 3,966,983 | 6/1976 | Dexter et al. | 426/439 |
| 4,124,727 | 11/1978 | Rockland et al. | 426/560 |
| 4,297,376 | 10/1981 | Nelson | 426/808 X |

OTHER PUBLICATIONS

Snack Food, Oct. 1981, "Missouri Firm has 'Open Sesame' to Snack Market", by Jerry Hess, Editor.

Primary Examiner—Joseph Golian
Attorney, Agent, or Firm—Hopkins French Crockett Springer & Hoopes

[57] ABSTRACT

A process for making fried expanded snack products includes preparing a moist dough principally from solids, such as corn or potato solids. Larger particle size dry food particles, such as wheat or rice particles, are included in the dough. The dough is then formed, such as by roller-forming, into a thin sheet, and dough pieces cut from the sheeted dough are fried in hot cooking oil to form a fried expanded snack. The larger food particles project through or are contained in the surface of each dough piece to cause steam to escape during frying, which greatly reduces "puffing", i.e., formation of undesired bubbles in the snack, during frying. By providing a sufficient number of larger particles with an average particle size at least about to the thickness of the dough piece (so that an appreciable number of particles can project through or be contained in the surface of the dough piece), formation of undesired large bubbles is significantly reduced. The size of the largest bubbles formed during drying is proportionately reduced as the amount of larger particles added to the dough is increased. Formation of bubbles larger than a maximum tolerable size can be controlled to within acceptable limits by adding particulates greater in particle size than the dough thickness and in an amount that results in at least one particle per unit surface area of the sheeted dough piece, where said unit surface area is the largest acceptable size (area) of any bubbles formed during frying.

17 Claims, No Drawings

PREVENTION OF PUFFING DURING FRYING OF EXPANDED SNACK PRODUCTS

This is a continuation of application Ser. No. 786,162 filed 10/09/85, now abandoned which in turn is a continuation of application Ser. No. 684,966 filed 12/20/84, now abandoned which in turn is a continuation of application Ser. No. 583,283 filed 02/27/84, now abandoned which in turn is a continuation of application Ser. No. 506,637 filed 06/22/83, now abandoned which in turn is a continuation of application Ser. No. 259,620 filed 05/01/81, now abandoned.

BACKGROUND

1. Field of the Invention

This invention relates to a process for making expanded fried snack products from any of a number of combinations of dry starch-containing ingredients, including cereal flours, dried potatoes, etc.; and more particularly, to a process for reducing undesired "puffing" of an expanded snack during deep fat frying.

2. Description of the Prior Art

A variety of deep fat fried snacks are on the market today. These snack products are commonly made from a dough containing corn or potato solids. Typically, the dough is shaped or formed, such as by roller-forming or extrusion under high pressure, and the shaped or formed dough pieces are then deep fried to produce the finished expanded fried snack product. It has been widely recognized that the problem of "puffing" can occur in snack products made from a formed moist dough piece that is deep fat fried. Puffing commonly occurs because of the accumulation of steam between the outer surfaces of the dough piece during frying. This causes the sides of the dough piece to separate, forming bubbles (i.e., internal voids) or, when the bubbles rupture, exposed holes in the snack. Puffing detracts from the appearance of the snack, and when filled with excess fat, it greatly increases the fat content of the product. Separation of a dough piece in the fryer also has been referred to in the art as "pillowing" or "blistering", but the term "puffing" is used herein to describe each of these phenomena, generally.

There have been a number of prior art techniques devoted to reducing puffing in expanded fried snacks. U.S. Pat. No. 2,905,559 to Anderson et al describes an attempt to avoid puffing by perforating the dough sheet with spikes after discrete pieces are formed. In a related patent, U.S. Pat. No. 3,278,311 to Brown et al, partly cooked corn kernels are treated by cutting the kernels to a size range of 0.5 to 1.27 mm and plasticizing the cut particles to make a cohesive dough. The dough is then rolled into sheet form and the dough sheet is perforated prior to frying.

U.S. Pat. No. 3,886,291 to Willard discloses experiments illustrating the importance of proper ingredient selection to eliminate puffing in extruded products made from mixtures of dehydrated potatoes and various starches. Only products made from potato starch and tapioca starch were of acceptable quality. No attempts were made to control puffing in these experiments.

U.S. Pat. No. 2,916,378 to Kunce et al mentions that ordinary corn chips do not puff because they are coarsely ground so that the dough is "discontinued" and steam from moisture within the dough can readily escape from the surface during the frying process. The manufacture of corn chips is described in several patents, such as U.S. Pat. Nos. 2,002,053 to Doolin and 3,278,311 to Brown et al. Controlling the particle size of the ground corn is extremely difficult because of many critical process variables, including the size, age and moisture content of the dry corn kernels, variations in moisture content and thus the softness of the soaked, partially-cooked kernels, rate of feed to the grinder, adjustment of clearance between the rotating grinding wheels and the gradual wearing of the grinding wheels. As a result, controlling puffing in sheeted snacks made from corn processed in this manner by relying on the critical control of particle size in the dough is impractical. In the Kunce et al process the corn is finely ground and the corn-based dough has a smooth continuous surface which would ordinarily puff if fried with a 50% moisture content; but Kunce et al rapidly predry the formed corn snacks in a high-temperature oven to about 15% moisture prior to frying, which creates an acceptable texture of small surface blisters following frying.

U.S. Pat. No. 3,883,671 to Shatila describes a process in which formation of surface blisters or puffing is reduced by moistening the surfaces of the flat dough pieces with water after forming and before frying. The surfaces can be moistened by spraying, dipping, or steaming. The Shatila patent also refers to other methods known to reduce puffing or blistering in similar processes. These include reference to U.S. Pat. No. 3,608,474 to Liepa, in which potato-based dough pieces are confined within a mold to physically prevent large blisters from forming. Another prior art technique is to form dough pieces with a corrugated surface, which also tends to prevent blistering. A further technique involves forming the dough to very thin layers of about 0.4 mm thickness, since blistering is reduced with thinner dough pieces. Shatila U.S. Pat. No. 3,883,671 emphasizes the difficulty of consistently producing a snack product with a smooth, blister-free surface when the thickness is in the range 0.030 to 0.045 inch (0.76 to 1.1 mm).

Thus, the prior art has disclosed a number of attempts at solving the problem of puffing or blistering; but the prior art has not provided a method that successfully controls puffing to within acceptable limits independently of such factors as (1) the thickness of the dough pieces (i.e., for thicker dough pieces of about 1.0 mm thickness or more), (2) the moisture content of the dough (i.e., for a moisture content greater than about 40% to 50%), and (3) the particular ingredients contained in the dough, without requiring special equipment such as water-moistening apparatus, hightemperature ovens, dough perforating apparatus, corrugating apparatus, molds for confining the dough, etc.

SUMMARY OF THE INVENTION

Briefly, this invention provides a process for producing a fried expanded snack product in which undesired puffing can be prevented, or at least controlled to within acceptable limits. The process includes the step of preparing a dough from a variety of relatively fine particle size dry solid ingredients, and dry food particles of relatively larger particle size. A dough piece is formed from the dough and fried in hot cooking oil to produce an expanded fried snack product. The larger food particles are of a particle size at least about the same thickness as the formed dough piece prior to frying, so that the particles can project through or be contained in the surface of the dough piece to allow steam to escape during frying. This greatly reduces undesired puffing of the snack during frying.

In one form of the invention, the larger food particles are provided by extraneously added dry food particles of the proper particle size. In another form, the larger food particles are naturally contained in one or more of the dry solid ingredients that are part of the original dough mixture. For example, cracked wheat and cracked bulgur can be made to contain a sufficient amount of properly-sized larger particles that can be used in this process to reduce puffing.

The size of bubbles produced from puffing can be controlled by the amount of sufficiently large dry food particles included in the dough. The size of the largest bubbles formed during frying is proportionately decreased as the number of sufficiently large particles added to the dough is increased. Formation of bubbles larger than a certain tolerable size can be controlled to within acceptable limits by providing particles in an amount that results in one or more particles per unit surface area of the dough piece, where said unit surface area is the largest acceptable size (area) of any bubbles formed during frying. For example, in one practice of the invention, formation of bubbles larger than 6 mm in size can be essentially prevented by mixing a sufficient number of particles of proper size into the dough that will provide, on the average, one or more such particles for approximately each 36 sq mm of surface area of the dough piece.

The process of this invention greatly reduces puffing without requiring additional special equipment, such as high-temperature ovens, water moistening apparatus, equipment for for externally puncturing the surface of the dough piece or for corrugating the dough piece, or molds for confining the dough piece, for example. As a result of this process, novel snack products can be produced, inasmuch as food particles which would ordinarily not be used in the manufacture of such snacks can be used as novel flavoring ingredients, in addition to serving as a means for reducing puffing.

This method has been found to be particularly useful in preventing undesired puffing in snack products made from dough pieces about 1.0 mm in thickness or greater, with a moisture content in excess of about 40%. Dough pieces of this thickness and moisture content are ordinarily thought of as being particularly susceptible to undesired puffing, when compared with thinner, drier dough pieces.

These and other aspects of the invention will be more fully understood by referring to the following detailed description.

DETAILED DESCRIPTION

A fried expanded snack product is produced from a dough prepared principally from dry food solids selected from the group consisting of corn, potato, tapioca, amioca, wheat, and rice solids, and mixtures thereof. More specifically, the principal dry solid ingredients from which the dough is prepared can include various combinations of cereal flours such as corn flour; dried starch-containing root crops such as potato flakes; and starches separated from either. The corn solids contained in the dough can include pre-cooked whole corn flour, lime-treated corn flour (known as tortilla flour) and pre-cooked or raw corn meal, for example. Other pre-gelatinized or raw cereal flours, such as oak flour, bulgur flour, wheat flour, or rice flour can be used. The dried root crop solids can be from various combinations of dehydrated mashed potatoes, potato flour, or ground dehydrated potatoes, or cassava flour. Various combinations of corn, tapioca, potato, amioca and other starches, gelatinized or ungelatinized, also can be used in preparing the dough.

The principal dry food solids contained in the dough are of relatively fine particle size. In one practice of the invention, the average particle size of such principal dry food solids is less than about 0.5 mm. Snack products made from a dough containing such fine particles size ingredients as its principal component commonly experience problems of puffing when fried.

A sufficient quantity of properly-sized dry food particles are combined with the principal dough ingredients to reduce puffing of the dough during subsequent deep fat frying. These particles are of larger size, on the average, than the size of the dry food solids that comprise the principal component of the dough. These larger particles can be a variety of extraneously added dry food particles, such as intact cereal grains or seeds; or they can be ground to the desired particle size, as in the case of peanuts, for example. Other examples are the larger particles naturally contained in one or more of the whole cereal grains that also provide the principal component of the dough formulation. Cracked wheat, cracked bulgur, cracked rice, dry milled corn, rolled oats, barley and rye are examples.

Water is combined with the dry solid ingredients to form a moist dough preferably containing about 40% to about 60% moisture, by weight. A dough containing such a moisture content typically puffs when deep fat fried, especially if the dough piece has a thickness of about 1.0 mm or more; but this problem is overcome by including the larger dry food particles, as described in more detail below. The larger dry food particles are normally included with the principal dry ingredients of the dough formulation before the water is added to more easily form a dough in which the larger particles are uniformly dispersed throughout the dough. The number of dry particles within the desired particle size range (described below) is adjusted to control the amount of puffing during subsequent frying. During preparation of the dough the larger particles are not appreciably altered in size or character, and they also are not reactive with the other ingredients of the dough when subsequently fried, i.e., they essentially retain their particular nature during subsequent frying.

After the dough containing the particulates is prepared, the dough is formed into desired shapes. Preferably the dough is roller-formed into a thin sheet, about 1.0 mm to 1.2 mm in thickness. The sheeted dough is then cut into small pieces which are immediately deep fat fried in hot cooking oil. Alternatively, the dough can be extruded under pressure through a small die opening, and pieces cut from the extruded dough are then immediately fried. The dough also can be extruded into thin tubular rods about 2 mm in diameter. In any case the dough piece being fried has a moisture content at least about 40%, by weight, and typically from about 40% to about 60%, by weight, at the time of frying.

The presence of the proper number of properly-sized larger food particles results in much less puffing in the fried product when compared with a similar product that does not contain such larger particles. The particles are of a size at least similar to the thickness of the dough piece being fried, which causes a considerable number of the particles to project through or be contained in the surface of the dough piece. For thin-sheeted dough pieces, it is most preferable to select the particle size such that particles will project randomly from both sides of the dough piece. For different shapes, such as an extruded cylindrical rod (say 2 mm in diameter), the number of larger particulates contained in the dry ingredients used in preparing the dough is increased. Thus, a sufficient number of particles will be present in the surface of the extruded dough piece to limit puffing to desirable levels. In either case, the particles allow steam from evaporating moisture throughout the dough piece to escape from the surface of the dough, avoiding undesired puffing that would otherwise occur.

The dough pieces can be pre-moistened before frying, in a manner similar to that described in U.S. Pat. No. 3,883,671 to Shatila, which also can reduce the amount of puffing. However, it has been discovered that the presence of the food particles in the dough reduces puffing independently of whether or not the dough pieces are moistened before frying and in fact is more effective than moistening.

The method of this invention will be more fully described in the context of the following examples.

EXAMPLE 1

Corn snacks were prepared in a pilot-plant to determine the effects of spraying (pre-moistening) on puffing, with and without use of particulates in the dough mixture.

A corn snack was made with the following dry ingredients:

| Ingredients 1A | % | Grams |
| --- | --- | --- |
| Partially-cooked whole corn flour, through US 40 mesh | 52.7 | 158.1 |
| Gelatinized corn flour, through US 80 mesh | 19.0 | 57.0 |
| Amioca starch | 19.0 | 50.7 |
| Corn starch | 9.3 | 27.9 |
| Salt | 2.0 | 6 |
| Water | — | 195 |

Using a Hobart 5-qt mixer, the water at room temperature was added to the dry mix using the flat paddle attachment, with the mixer on low speed, about 60 rpm. After mixing for a total of 60 seconds, the paddle was removed and replaced with a dough hook and mixing was continued for an additional 4 minutes at 109 rpm.

The dough was allowed to rest 15 minutes and was then sheeted between the rollers of a conventional tortilla chip sheeter, such as that made by Electra Food Machinery Company, Model HTO-17. The sheeter was adjusted to produce a dough thickness of about 1.1 mm.

A rotary die situated under the discharge roller cut the sheet into triangles, approximately 5 cm per side. The cut pieces were treated with various spraying treatments; one portion was not sprayed; but fried directly; a second portion was sprayed on one side only; a third portion was sprayed on both sides; and the fourth portion was sprayed on both sides and allowed to rest for two minutes before being fried.

The treated dough pieces were immediately fried at 175° C. in a Belshaw continuous donut frier fitted with a circulating pump and adjustable speed take-out mechanism. After frying, the product was drained and examined for puffing. The product was segregated into four portions: those containing bubbles less than 3 mm diameter, those with bubbles between 3 and 6 mm, between 6 and 12 mm, and finally those with bubbles larger than 12 mm diameter. The percentage of each portion by weight was then recorded.

A portion of cracked wheat was added to the same formula at a level of 10% of the total dry ingredients:

| Ingredients 1B | % | Grams |
| --- | --- | --- |
| Partially-cooked whole corn flour, through US 40 mesh | 47.94 | 143.8 |
| Gelatinized corn flour, through US 80 mesh | 17.25 | 51.8 |
| Amioca Starch | 15.34 | 46.0 |
| Corn Starch | 8.46 | 25.4 |
| Cracked wheat particulate | 10.00 | 30.0 |
| Salt | 2.00 | 6.0 |
| Water | — | 195.0 |

The screen analysis of the cracked wheat was as follows:

| | |
| --- | --- |
| On 20 mesh (0.833 mm opening) | 35.8% |
| On 40 mesh (0.417 mm opening) | 51.2% |
| On 60 mesh (0.250 mm opening) | 6.7% |
| Under 60 mesh | 6.3% |

Dough samples were prepared as described before, sprayed by the same treatments, fried and the puffing observed. The results are shown below in Table A.

TABLE A

EFFECT OF SPRAYING AND PARTICULATES (Example 1)

| | Without Particulates | | | | With Particulates | | | |
| --- | --- | --- | --- | --- | --- | --- | --- | --- |
| Sample | A | B | C | D | E | F | G | H |
| Spray | None | 1 side | 2 sides | 2 sides + 2 min hold | None | 1 side | 2 sides | 2 sides + 2 min hold |
| Average dough thickness, mm | .96 | 1.19 | 1.22 | 1.05 | 0.82 | 1.10 | 0.97 | 1.18 |
| Puffing Count | | | | | | | | |
| <3 mm, % | 2 | 8 | 17 | 3 | 16 | 19 | 54 | 53 |
| 3/6 mm, % | 0 | 3 | 10 | 12 | 14 | 16 | 21 | 19 |
| 6/12 mm, % | 5 | 4 | 15 | 18 | 42 | 34 | 21 | 20 |
| +12 mm, % | 93 | 85 | 58 | 67 | 28 | 31 | 4 | 8 |
| Total over 6 mm, % | 98 | 89 | 73 | 85 | 70 | 65 | 25 | 28 |
| Total under 6 mm, % | 2 | 11 | 27 | 15 | 30 | 35 | 75 | 72 |

The results of Example 1 illustrate that the larger particles contained in the cracked wheat greatly reduce the amount of puffing, independently of whether the dough pieces are moistened prior to frying. The amount of fried products having puffing within an acceptable range, i.e., with bubbles below 6 mm in size, is increased by the addition of the dry particles. In this and later series of experiments, bubbles greater than 6 mm diameter are judged "unacceptable"; those snacks with bubbles under 6 mm diameter are judged "acceptable". In Example 1, the amount of acceptable product increased, on the average, 6.45 times when the particulates were added, independent of the premoistening treatments.

We have discovered that the number of larger particulates and the size of the particulates in relation to dough thickness control both the number and size of bubbles in the fried product. As the number of properly-sized dry food particulates contained in the dough formulation is increased, a generally proportionate decrease in the size and number of bubbles in the fried product is produced.

The amount of larger particulates contained in the dough formulation is preferably on a number basis (i.e., number of individual particles), rather than on a weight basis. The number of individual particles contained in a gram of particulate material is initially determined. A sufficient number of these particles are then included in the dough mixture (by providing a reasonably uniform number of the particles per unit area of sheeted dough) to produce a fried product that essentially avoids undesired puffing.

The particles are included on a number basis, rather than a weight basis, because it has been found necessary to provide at least a certain number of particles per unit area of sheeted dough in order to control puffing to within acceptable limits. Particles are not added on a weight basis because of the differences in bulk densities between different types of particulate materials. For example, the following shows the difference in bulk density of particles from raw cut wheat and precooked bulgur. The latter is more dense, since the wheat has been precooked and dried before grinding, i.e., it has shrunk and has become almost glass-like. The cracked wheat, on the other hand, contains particles of separated bran which are very light in weight.

Density of Snack Particulates

| Ingredient | Sieve Size | Number/gram |
|---|---|---|
| Cracked Wheat | 10/16* | 1200 |
|  | 16/20 | 2625 |
|  | 20/40 | 4560 |
| Precooked Wheat | 10/16 | 244 |
|  | 16/20 | 1343 |
|  | 20/40 | 3397 |

*passes 10 U.S. mesh, retained on 16 U.S. mesh

It can be assumed that the presence of a particle in the dough prevents the formation of a bubble at the point in the dough where the particle penetrates or is present in the surface, allowing steam to escape. Thus, a bubble that is formed in the dough piece must necessarily be formed between adjacent particulates. Assuming that bubbles 6 mm in size (largest dimension) are the maximum size allowable for an acceptable snack, then the sheeted dough should have at least one particle for about every 36 mm$^2$ (equivalent to a square 6 mm per side) of surface area. The larger particulates, being in the form of dry food particles, are capable of being measured as to the specific number of snack particles included in the dough formulation.

EXAMPLE 2

An experiment was conducted to determine the amount (on a weight basis) of dry food particles in a given material that should be included in 100 grams of dry solids in a dough having one particle for each 36 mm$^2$ of a surface area when the dough is sheeted to an average thickness of 1 mm.

A corn snack dough is prepared from 100 grams of dry solids combined with 63.6 grams of water. The specific gravity of this dough is determined to be 1.107 gm/cc, the total volume of the dough being 147.8 cc. Assuming that cracked wheat is to be included in the dry solids with a particle size of 10/16 (passes 10 mesh, retained on 16 mesh), it is determined that there are 1200 such particles per gram. Knowing the desired sheet thickness of the dough, i.e., 1.0 mm, and the weight and density of the dough, the area of the sheeted dough can be determined to be 1478 cm$^2$. Assuming that one particle of cracked wheat is required for each 36 mm$^2$ of sheet area, it is determined that 4106 particles are required. Knowing the number of particles per gram, it can be determined that 3.42 grams of such particles per 100 grams of solids in the dough are required to provide at least one particle for each 36 mm$^2$ of the sheeted dough.

These relationships can be expressed by the following formula:

$$X = \frac{1000\,(D + W)}{ASTN}$$

where $X$ = weight of particles in grams
$D$ = weight of dry solids in grams
$W$ = weight of water in grams
$A$ = area of largest bubble in mm$^2$/particle
$S$ = specific gravity of dough in gm/cc
$T$ = sheet thickness in mm
$N$ = number of particles/gm Using this formula for the example given above, where 1000 equals the factor for converting milligrams to grams, the weight of cracked wheat particles to be added to the dough is:

$$\frac{1000(100 + 63.6)}{(36)(1.107)(1.0)(1200)} = 3.42 \text{ grams}$$

EXAMPLE 3

Experiments were conducted to determine the effect on puffing of snacks of increasing dough thickness.

In this test, the formula of Example 1B was used with a particulate consisting of a commercially-available precooked wheat known as bulgur. This product was ground to pass a 16 mesh screen.

| Ingredients | % | Grams |
|---|---|---|
| Partially-cooked whole corn flour, through US 40 mesh | 47.94 | 143.8 |
| Gelatinized corn flour, through US 80 mesh | 17.25 | 51.8 |
| Amioca Starch | 15.34 | 46.0 |
| Corn Starch | 8.46 | 25.4 |
| Particulates (Total Bulgur) | 10.00 | 30.0 |
| Salt | 1.0 | 3.0 |
| Water | — | 200 |

The screen analysis of the bulgur used in this experiment was as follows:

|  | | Max. Dia, mm | Min. Dia, mm | Ave. Dia, mm |
|---|---|---|---|---|
| On 20 mesh | 57.7% | 1.168 | 0.833 | 1.00 |
| On 40 mesh | 26.4% | 0.833 | 0.417 | 0.62 |
| On 60 mesh | 6.2% | 0.417 | 0.250 | 0.33 |
| through 60 | 2.9% | 0.250 | — | — |

The dough, prepared as in Example 1, was held for a period of 25 minutes before forming. It was then sheeted, using a Rondo sheeter in five passes of 12, 8, 5, 3, mm and then to the final thickness shown in the table below. Rectangular pieces approximately 1"×2" were cut manually from the final sheet and fried directly in a deep-fat fryer in which vegetable oil was maintained at 175° C. Before frying, the cut pieces were sprayed lightly on each side with finely-atomized spray of water.

The final Rondo settings were 0.5, 0.75, 1.0, and 1.25 mm. Measurements were made of the final dough sheet thickness after the dough was cut into individual pieces, but before it was sprayed.

The 16/20 fraction (passes 16 mesh, retained on 20 mesh), average diameter 1.0 mm of the ground bulgur or 57.7% of the total bulgur, was defined as the particulate in this example and was examined and found to have 1343 particles/gm. The mixed dough had a specific gravity of 1.107 gm/cc.

The amount of particulate measuring over 20 mesh for 1.0 mm average diameter in the sheeted dough was determined according to the formula in Example 2. In addition, the average number of particulates for each 36 mm² of sheeted dough surface was calculated, based on the level of particulates in the dry mix (10%) and the quantity of 16/20 particulates in the cracked bulgur (57.7%). The units of dough in the experiment were determined by dividing total the surface area of the dough (in mm²) by 36 mm². The number of particles per unit of dough were then determined by the following formula:

$$\frac{part.}{unit} = \frac{N \cdot P \cdot S \cdot T \cdot A}{1000 \, wt.}$$

where

- $X$ = weight of particles in grams
- $P$ = weight of bulgur particulate of proper size (1.0 mm) in grams
- $N$ = number of particles per gram
- $S$ = specific gravity of dough in gm/cc
- $T$ = dough thickness in mm
- $A$ = area of largest bubble in mm²/particle
- wt. = weight of dough in grams For the dough ingredients described above, $$\frac{part.}{unit} = \frac{(30)(.577)(1343)(.107)(.82)(36)}{1000(500)} = 1.52 \frac{part.}{unit}$$

These results, as well as the percentage of product with puffing over 6 mm diameter, are shown below.

| Sample | A | B | C | D |
|---|---|---|---|---|
| Rondo opening, mm | 0.5 | .75 | 1.0 | 1.25 |
| Average dough thickness, mm | 0.82 | 1.11 | 1.49 | 1.9 |
| Particulates | | | | |
| Type: | | Bulgur 16/20 mesh | | |
| Level in formula, % | 5.77 | 5.77 | 5.77 | 5.77 |
| No. per 36 mm sq. | 1.5 | 2.1 | 2.8 | 3.5 |
| Ratio to dough thickness | 1.22 | .90 | .67 | .53 |
| Puff | | | | |
| <3 mm, % | 59 | 19 | 8 | 5 |
| 3/6 mm, % | 32 | 23 | 21 | 2 |
| 6/12 mm, % | 9 | 41 | 21 | 6 |
| >12 mm, % | 0 | 16 | 50 | 87 |
| Total over 6 mm, % | 9 | 57 | 71 | 93 |
| Acceptable, under 6 mm, % | 91 | 43 | 29 | 7 |

The results of Example 3 showed that puffing can be controlled to within acceptable limits with thin dough pieces (less than about 1 mm in thickness). However, the results also showed that the added particulates did not reduce puffing to within acceptable limits for thicker dough pieces above 1.0 mm in thickness, since the particulates were too small in relation to the dough thickness.

EXAMPLE 4

The procedure of Example 3 was followed, except that the size of the particulates was chosen so that each dough sheet would have an added larger particulate of approximately the same thickness as the dough sheet, as well as a second sample with a smaller particulate. The results, shown below in Table B, indicated that particulates with a particle size similar to the dough thickness produced products essentially free of puffing, whereas undesired puffing progressively increased as the dough thickness became increasingly greater than the particle size.

EXAMPLE 5

A base mixture was made of the snack ingredients shown as Formula 1A. A series of snack mixtures were made from the same base mixture in which the level of particulates was varied from 0% to 15% of the total dried mix. 3000 gm each of the blended mix was blended with 2000 ml of water in a 20-qt. Hobart using a procedure identical to that of Example 1. The samples were sheeted in the pilot plant tortilla chip sheeter as used in Example 1. All samples were sprayed lightly on both sides before frying at 175° C. The results, shown below in Table C, indicated that undesired puffing is progressively reduced as the amount of particles increases. The amount of puffing over 6 mm decreases to within acceptable limits as the number of particles for each 36 mm² of dough surface area approaches one.

EXAMPLE 6

The same base mixture of snack ingredients as in Example 1A was mixed with various size bulgur particles at a level of 10% of the total dry solids. The samples were processed as in Example 5 and analyzed for puffing, and the results shown below in Table D indicate that puffing is controlled to within desirable limits when the particle size is about the same or greater than the dough thickness.

TABLE B
EFFECT OF PARTICLE SIZE ON PUFFING (Example 4)

| Sample | A | B | C | D | E | F | G | H |
|---|---|---|---|---|---|---|---|---|
| Rondo opening, mm | 0.5 | 0.5 | 0.75 | .75 | 1.0 | 1.0 | 1.5 | 1.5 |
| Average dough thickness, mm | .79 | .81 | 1.13 | .96 | 1.38 | 1.49 | 2.05 | 2.05 |
| Particulates | | | | | | | | |
| Screen Size | 20/25 | 35/40 | 16/20 | 25/30 | 14/16 | 20/25 | 10/14 | 16/20 |
| Size, average diameter, mm | .77 | .46 | 1.0 | .65 | 1.29 | .77 | 1.69 | 1.0 |
| Number/gm | 2942 | 8070 | 1370 | 4610 | 588 | 2942 | 286 | 1340 |
| Type, Bulgur | | | | | | | | |
| Level in formula, % | 10 | 10 | 10 | 10 | 10 | 10 | 10 | 10 |
| No. per 36 mm$^2$ | 0.56 | 1.56 | 0.36 | 1.05 | 0.19 | 1.04 | 0.14 | 0.65 |
| Ratio to dough thickness | .97 | .57 | .88 | .68 | .89 | .52 | .80 | .49 |
| Puff | | | | | | | | |
| Over 6 mm, % | 0 | 22 | 44 | 65 | 31 | 72 | 69 | 81 |

TABLE C
EFFECT OF QUANTITY OF PARTICULATES ON PUFFING (Example 5)

| Sample | A | B | C | D | E | F | G |
|---|---|---|---|---|---|---|---|
| Average dough thickness, mm | 1.04 | 1.07 | 1.14 | 1.08 | 1.13 | 1.2 | 1.2 |
| Particulates | | | | | | | |
| Screen Size | 10/16 | | | | | | |
| Size, average diameter, mm | 1.58 | | | same | | | |
| Number/gm | 244 | | | | | | |
| Type, Bulgur | | | | | | | |
| Level in formula, % | 15 | 12.5 | 10 | 7.5 | 5 | 2.5 | 0 |
| No. per 36 mm$^2$ | 0.91 | 0.78 | 0.66 | 0.47 | 0.33 | 0.17 | 0 |
| Ratio to dough thickness | 1.51 | 1.47 | 1.38 | 1.46 | 1.40 | 1.32 | 0 |
| Puff | | | | | | | |
| Over 6 mm, % | 6 | 5 | 9 | 10 | 34 | 68 | 74 |

TABLE D
EFFECT OF PARTICLE SIZE ON PUFFING (Example 6)

| | A | B | C | D | E | F |
|---|---|---|---|---|---|---|
| Average dough thickness, mm | 1.12 | 1.12 | 1.16 | 1.21 | 1.21 | 1.09 |
| Particulate screen size | 10/16 | 16/20 | 20/40 | 40/60 | 60/80 | −80 |
| Maximum diameter, mm | 1.981 | 1.168 | 0.833 | 0.417 | 0.25 | 0.18 |
| Minimum diameter, mm | 1.168 | 0.833 | 0.417 | 0.25 | 0.18 | — |
| Average diameter, mm | 1.58 | 1.00 | 0.62 | 0.34 | 0.22 | — |
| Number/gm | 244 | 1340 | 3400 | 10,000+ | 10,000+ | |
| Type | Bulgur, screened as indicated | | | | | |
| Level in formula, % | 10 | 10 | 10 | 10 | 10 | 10 |
| No. per 36 mm$^2$ | 0.65 | 3.6 | 9.4 | 23 | — | — |
| Ratio to dough thickness | 1.41 | .89 | .53 | .28 | — | — |
| Fat | 29 | 30 | 29 | 31 | 32 | 34 |
| Puff | | | | | | |
| Over 6 mm, % | 13 | 15 | 31 | 89 | 98 | 84 |

EXAMPLE 7

Typical precooked rice (MJB Instant retail product) was milled and screened to prepare particulates with mesh size 10/16, average diameter 1.58 mm, and mesh size 16/20 with average diameter 1.0 mm. The formula of Example 1A was used as the base snack mix to which the particulates were added at various levels of the dried mix. The laboratory Rondo sheeter was used as described in Example 2, with final settings of 0.75 and 0.5 mm. From experience, it was known that these settings would give a dough thickness of approximately 1.1 and 0.85 mm.

The formula described in Example 2 was used to determine the quantity of particulates to add to the examples to achieve levels of approximately 1, 2, 3, and 4 units per 36 mm$^2$. The results are tabulated in Table E below.

In Examples C, E, G, and J, the level of 1.0 mm diameter particles in the dough (particles per 36 mm$^2$) and the resulting percentage of snacks having puffing over 6 mm diameter were 1.08 and 44%, 2.25 and 24%, 3.07 and 1.5%, 3.84 and 1.0%. In these examples, the added particulates had a larger particle size than the average thickness of the dough, thereby assuring that a large percentage of the particles punctured the surface of the dough piece. When the particulates were added similarly to the thicker dough, as in Examples B, D, F and H the results in terms of reduced puffing were not as significant, although puffing was reduced as the amount of added particulates was increased. The number of particulates added (particles per 36 mm$^2$) and the percentage of products showing puffing over 6 mm were 1.24 and 79%, 2.69 and 68%, 5.08 and 29%, 5.69 and 23%, in Samples B, D, F, and H, respectively.

An additional product, Sample A, was made with the thicker sheet, at a level of 1.09 particles/36 mm$^2$, using the larger 1.58 mm particles. This example illustrates that even particulates with a larger particle size than the dough thickness cannot, of itself, produce desired products. In this example, the amount of added particles was clearly not enough, since undesired puffing was found in 68% of the finished products.

Portions of this experiment were repeated with particulates made from raw uncooked rice and precooked corn, using the same fraction sizes. The results were substantially identical. A particularly flavorful snack was made by adding chopped peanuts to the same corn matrix, at levels of 30% of the total dry mix.

EXAMPLE 8

A base mixture was made from the following ingredients:

| Ingredients | % |
| --- | --- |
| Potato flakes (−20) | 45.4 |
| Potato Starch | 45.4 |
| Raw Corn Flour | 7.3 |
| Salt | 1.5 |
| MSG | 0.4 |
| Water | 100% relative |

A series of experiments were made in which the sheeted snacks were first made from the base mixture without particulates and later with added particles of precooked rice, 16/20 mesh. 300 ml of cold tap water was added to 300 grams of dry ingredients in the 5-quart bowl of the Hobart #50 mixer. Mixing was continued for one minute on Speed 1, at which point the dough became cohesive enough to be formed into a ball. The dough was held 5 minutes to equilibrate and then sheeted, using a Rondo sheeter in five passes of 12, 6, 3, 2 mm, and then to the final thickness shown in Table F below. The cut pieces were sprayed lightly on each side with a finely atomized spray of water and then fried in a deep-fat fryer in which vegetable oil was maintained at 175° C. Ten measurements were made, and averaged, of the final dough sheet thickness were made, and averaged, after the dough was cut into individual pieces, but before it was sprayed. The products were examined for puffing, and those showing puffed sections over 6 mm diameter were segregated, weighed, and expressed as a percentage of the total finished product. The results, shown below in Table F, indicate that the added particles can produce products essentially free of undesired puffing, even for relatively thicker dough pieces (approximately 1.0 mm thickness) in a dough with a relatively high moisture content (approximately 50% moisture by weight).

TABLE F

| EFFECT OF PARTICULATES IN SHEETED POTATO SNACKS (Example 8) | | | | |
| --- | --- | --- | --- | --- |
| Sample | A | B | C | D |
| Rondo Setting, mm | .75 | .5 | .75 | .5 |
| Sheet Thickness, mm | 1.00 | .71 | .95 | .83 |
| Particulates | | | | |
| Type | | Precooked rice | | |
| Size | 16/20 | 16/20 | 16/20 | 16/20 |
| Diameter, mm | 1.00 | 1.00 | 1.00 | 1.00 |
| No. per 36 mm$^2$ | 0 | 0 | 4.66 | 4.07 |
| Ratio to Dough Thickness | 0 | 0 | 1.05 | 1.20 |
| Product: | | | | |
| Puffing, % over 6 mm | 64 | 17 | 2 | 0 |
| Fat Content | 35.1 | 39.1 | 38.0 | 34.2 |

The following is a summary of acceptable products made in accordance with the various examples described above. The table summarized for each sample the ratio of particle size to dough thickness, the number of particles contained per 36 mm$^2$ of the sheeted dough, and the resulting percentage of products that experienced undesired puffing, i.e., bubbles greater than 6 mm in size.

| Ratio Particulate/Dough | Level Partic. per 36 mm$^2$ | Puffed Product, % (6 mm dia.) |
| --- | --- | --- |
| .57 | 1.56 | 22 |
| .85 | 5.7 | 23 |
| .89 | 3.6 | 15 |
| .97 | .56 | 0 |
| 1.05 | 4.66 | 2 |
| 1.19 | 3.1 | 2 |
| 1.20 | 4.1 | 0 |
| 1.22 | 1.5 | 9 |
| 1.26 | 3.8 | 1 |
| 1.38 | .66 | 9 |
| 1.41 | .65 | 13 |
| 1.46 | .47 | 10 |
| 1.47 | .78 | 5 |
| 1.51 | .91 | 6 |

The results of the tests have indicated that the ratio of particle size to dough thickness is most critical of the factors influencing puffing, and that products essentially free of undesired puffing can be produced when the average particle size of the particulates is at least about the same thickness as the formed dough piece. For example, the tests have shown that products essentially free of puffing are produced when the ratio of particle size to dough thickness is about 0.80 or more. Products in which puffing greater than 6 mm occurs in about 15% of the products, or less are considered essentially free of puffing. Commercially acceptable products can be produced when such products puffing occurs in about 25% of the products, or less.

TABLE E

| ADDITION OF RICE PARTICULATES TO CORN SNACKS AT 1, 2, 3, and 4 PARTICLES PER MM$^2$ (Example 7) | | | | | | | | | |
| --- | --- | --- | --- | --- | --- | --- | --- | --- | --- |
| Sample | A | B | C | D | E | F | G | H | J |
| Rondo opening, mm | .75 | .75 | .5 | .75 | .5 | .75 | .5 | .75 | .5 |
| Average dough thickness, mm | 1.22 | 1.02 | .89 | 1.11 | .93 | 1.39 | .84 | 1.17 | .79 |
| Particulate | | | | Precooked rice, ground and sifted | | | | | |
| Screen Size | 10/16 | 16/20 | 16/20 | 16/20 | 16/20 | 16/20 | 16/20 | 16/20 | 16/20 |
| Average diameter, mm | 1.58 | 1.0 | 1.0 | 1.0 | 1.0 | 1.0 | 1.0 | 1.0 | 1.0 |
| Number/gm (wt. basis) | 374 | 1780 | 1780 | 1780 | 1780 | 1780 | 1780 | 1780 | 1780 |
| Level in % | 10.06 | 2.86 | 2.86 | 5.73 | 5.73 | 8.60 | 8.60 | 11.46 | 11.46 |
| Ratio particle to dough thickness | 1.29 | .98 | 1.12 | .90 | 1.07 | .71 | 1.19 | .85 | 1.26 |
| Puff, over 6 mm, % | 68 | 79 | 44 | 68 | 24 | 29 | 1.5 | 23 | 1 |

The test results also have indicated that the amount of larger particulates in the dough (on a number basis) provides a correspondingly increasing reduction in puffing as the number of particulates in increased. Particularly for products with a greater dough thickness (about 1.0 mm, or more) undesired puffing can be minimized by providing particulates in an amount of at least one particulate for each 36 mm² of sheeted dough. Good results also can be obtained with fewer particles when the particulates are much greater in particle size than the dough thickness (a particle/dough ratio greater than about 1.5, for example). Dough thickness also affects puffing, since the test results have indicated that reducing dough thickness from, say 1.0 mm to 0.7 mm can of itself produce a large reduction in puffing. Although the thinner dough sheet can reduce puffing, it should be recognized that in instances where a snack product of greater thickness is more desirable, the added particulates can reduce puffing to within acceptable limits.

Thus, the present invention provides a method in which fried expanded snack products can be made essentially free of puffing from a relatively thick dough piece (about 1.0 mm in thickness) made from a moist dough (about 40% to 60% moisture content) without the need for additional special equipment to reduce puffing.

What is claimed is:

1. A method for reducing puffing of a fried expanded snack product made from a dough comprising finely divided dry starch-containing solids from which the dough is formed as a thin dough sheet and fried, the method comprising the steps of:
    a. preparing a dough principally comprised of finely divided dry starch-containing solids selected from the group consisting of corn, potatoes, wheat, rice, oats, tapioca, and mixtures thereof, in which a portion of the starch in the finely divided dry starch-containing solids is gelatinized and additional starch in the finely divided dry starch-containing solids comprises extraneously added ungelatinized starch, and in which the finely divided dry starch-containing solids are mixed with water to form a dough having a moisture content from about 40% to about 60% by weight of the dough;
    b. cracking dry cereal grains and combining said dry cracked cereal grains with said dough, the dry cracked cereal grains having a larger average particle size than the average particle size of the finely divided dry starch-containing solids;
    c. roller forming the dough for compressing the dough into sheet form of essentially uniform thickness and forming a piece from the dough sheet, the dry cracked cereal grains having an average particle size at least about the same as the thickness of the formed dough piece so that said dry cracked cereal grains project through or are contained in the surface of the formed dough piece; and
    d. frying the dough piece in hot cooking oil at said 40% to 60% moisture content and with said combination of gelatinized and ungelatinized starches contained in the dough piece at the time of frying, for forming an expanded fried snack product in which the dry cracked cereal grains provide a means of escape for the moisture contained in the dough piece and in which the larger food particles are present in the dough piece in an amount sufficient to reduce puffing of the snack product during frying when compared with the amount of puffing of a fried snack product made from the same dough piece that does not contain said larger food particles.

2. The method according to claim 1 in which the dry cracked cereal grains are contained in the dough piece in an amount such that formation of bubbles greater in size than about 6 mm is substantially prevented in at least about 85% of the fried products made from the dough.

3. The method according to claim 1 in which the cracked cereal grains are extraneously added to the dough ingredients.

4. The method according to claim 1 in which the cracked cereal grains are uniformly dispersed throughout the dough and remain in a solid art particulate form throughout frying.

5. The method according to claim 1 in which the thickness of the formed dough piece is from about 0.7 mm to about 2.0 mm.

6. The method according to claim 1 in which the dry cracked cereal grains comprise a component of the finely divided starch-containing solids which has been coarsely ground to a larger particle size than the principal finely divided dry starch-containing solids.

7. The method according to claim 1 in which the dough pieces has a sheet thickness up to about 1.0 mm to about 1.2 mm, and the dry cracked cereal grains have an average particle size of at least about 0.8 mm.

8. The method according to claim 1 in which the dry cracked cereal grains are contained in the dough piece in an amount such that there is at least about one such particle for about each 36 mm² of surface area of the formed dough piece.

9. The method according to claim 1 in which the finely divided dry starch-containing solids have an average particle size of about 0.5 mm or less.

10. A method for reducing puffing of a fried expanded snack product made from a dough comprising finely divided dry starch-containing solids from which the dough is formed as a thin dough sheet and fried, the method comprising the steps of:
    a. preparing a dough principally comprised of finely divided dry starch-containing solids selected from the group consisting of corn, potatoes, wheat, rice, oats, tapioca, and mixtures thereof, in which a portion of the starch in the finely divided dry starch-containing solids is gelatinized and additional starch in the finely divided dry starch-containing solids comprises extraneously added ungelatinized starch, and in which the finely divided dry starch-containing solids are mixed with water to form a dough having a moisture content from about 40% to about 60% by weight of the dough;
    b. cracking dry cereal grains and combining said dry cracked cereal grains with said dough, the dry cracked cereal grains having a larger average particle size than the average particle size of the finely divided dry starch-containing solids;
    c. roller forming the dough for compressing the dough into thin sheet form of essentially uniform thickness, and forming a dough piece from the dough sheet, the dry cracked cereal grains being present in the dough piece in an amount that provides, on the average, at least one dry cracked cereal grains particle for each 36 mm² of surface area of the dough piece, the dry cracked cereal grains having an average particle size about the same as the thickness of the dough piece so that the larger food particles project through or are contained in the surface of the formed dough piece; and d. frying the dough piece at said 40% to 60% moisture content and with said combination of gelatinized and ungelatinized starches contained in the dough at the time of frying to form an expanded fried snack product, the dry cracked cereal grains providing a means of escape for the moisture contained in the dough piece during frying and being present in an amount sufficient to reduce puffing of the fried product when compared with the amount of puffing of a fried snack product made from the same dough sheet that does not contain said larger food particles.

11. The method according to claim 10 in which the larger dry cracked cereal grains are extraneously added to the dough ingredients.

12. The method according to claim 10 in which the larger cracked cereal grains re contained in the dough piece in an amount such that the formation of bubbles greater in size than about 65 mm is substantially prevented in at least about 85% of the fried products made from the dough.

13. The method according to claim 10 in which the dry cracked cereal grains are uniformly dispersed through the dough and remain in a solid particulate form throughout frying.

14. The method according to claim 52 in which the thickness of the dough piece is from about 0.7 mm to about 2.0 mm.

15. The method according to claim 10 in which the dry cracked cereal grains comprise a component of the finely divided starch-containing solids which has been coarsely ground to a larger particle size than the principal finely divided starchcontaining solids.

16. The method according to claim 10 in which the dough piece has a sheet thickness from about 1.0 mm to about 1.2 mm, and the dry cracked cereal grains have an average particle size of at least about 0.8 mm.

17. The method according to claim 10 in which the finely divided dry food solids have an average particle size of about 0.5 mm or less.

* * * * *